US010538175B2

United States Patent
Lee et al.

(10) Patent No.: US 10,538,175 B2
(45) Date of Patent: Jan. 21, 2020

(54) APPARATUS FOR CONTROLLING CHARGING OF ENVIRONMENT-FRIENDLY VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Chun Hyuk Lee, Suwon-si (KR); Dong Jin Sohn, Pyeongtaek-si (KR); Yong Hoon Lee, Incheon (KR); Dong Jun Shin, Hwaseong-si (KR); Jee Wook Huh, Gwangmyeong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 40 days.

(21) Appl. No.: 15/832,688

(22) Filed: Dec. 5, 2017

(65) Prior Publication Data

US 2019/0070972 A1 Mar. 7, 2019

(30) Foreign Application Priority Data

Sep. 7, 2017 (KR) ........................ 10-2017-0114629

(51) Int. Cl.
  *B60L 58/12* (2019.01)
  *B60W 10/26* (2006.01)
  *B60W 10/08* (2006.01)
  *B60W 20/00* (2016.01)

(52) U.S. Cl.
  CPC ............ *B60L 58/12* (2019.02); *B60W 10/08* (2013.01); *B60W 10/26* (2013.01); *B60L 2240/54* (2013.01); *B60W 20/00* (2013.01)

(58) Field of Classification Search
  CPC ..... B60L 58/12; B60L 2240/54; B60W 10/08; B60W 10/26; B60W 20/00
  USPC ........................................................ 320/104
  See application file for complete search history.

(56) References Cited

U.S. PATENT DOCUMENTS

| 9,444,285 | B2 * | 9/2016 | Kamiya | .................... H02J 7/35 |
| 9,656,551 | B2 * | 5/2017 | Matsuda | ................ B62K 11/04 |
| 10,120,032 | B2 * | 11/2018 | Akamine | .............. H01M 10/48 |
| 2004/0189248 | A1 * | 9/2004 | Boskovitch | ........... H02J 7/0021 |
| | | | | 320/116 |

(Continued)

FOREIGN PATENT DOCUMENTS

| JP | 3967043 B2 | 8/2007 |
| JP | 5029781 B2 | 9/2012 |
| KR | 10-1500080 B1 | 3/2015 |

*Primary Examiner* — M Baye Diao
(74) *Attorney, Agent, or Firm* — Knobbe Martens Olson & Bear LLP (57) ABSTRACT

The present disclosure relates to an apparatus for controlling charging of an environment-friendly vehicle. The apparatus includes a high-voltage battery SOC determining unit configured to determine a state of charge (SOC) of a high-voltage battery that is a main power source, an auxiliary battery SOC determining unit configured to determine an SOC of an auxiliary battery that assists power of the high-voltage battery, and an auxiliary battery charging control unit configured to, when receiving a request for an operation of an engine for controlling heating, perform a control such that the auxiliary battery is charged by using the high-voltage battery.

17 Claims, 6 Drawing Sheets

(56) References Cited

U.S. PATENT DOCUMENTS

| | | | | |
|---|---|---|---|---|
| 2009/0158079 A1* | 6/2009 | Chung | ............... | G05B 23/0264 |
| | | | | 714/2 |
| 2010/0181957 A1* | 7/2010 | Goeltner | ................. | B60L 8/003 |
| | | | | 320/101 |
| 2012/0074911 A1* | 3/2012 | Murao | ................. | H02J 7/0014 |
| | | | | 320/134 |
| 2013/0043826 A1* | 2/2013 | Workman | ........... | H01M 2/0245 |
| | | | | 320/101 |
| 2013/0320911 A1* | 12/2013 | Kamiya | ................... | H02J 7/35 |
| | | | | 320/101 |
| 2014/0312828 A1* | 10/2014 | Vo | ..................... | H01M 10/4257 |
| | | | | 320/103 |
| 2017/0008408 A1* | 1/2017 | Park | ................... | B60L 11/1805 |
| 2018/0056807 A1* | 3/2018 | Park | ................... | B60L 11/1864 |

* cited by examiner

APPARATUS FOR CONTROLLING CHARGING OF ENVIRONMENT-FRIENDLY VEHICLE, SYSTEM INCLUDING THE SAME, AND METHOD THEREOF

CROSS-REFERENCE TO RELATED APPLICATION

This application is based on and claims the benefit of priority to Korean Patent Application No. 10-2017-0114629, filed on Sep. 7, 2017, in the Korean Intellectual Property Office, the disclosure of which is incorporated herein in its entirety by reference.

FIELD

The present disclosure relates to an apparatus for controlling charging of an environment-friendly vehicle, a system including the same, and a method thereof, and more particularly, to a technology of maintaining an SOC level of a high-voltage battery at a suitable level in a state in which a charging toque is maintained during driving of an engine.

BACKGROUND

Due to the high prices of oils and regulation of exhaust gases throughout the world, environment-friendly policies and improvement of fuel efficiency have become core goals in the development of vehicles. Accordingly, the vehicle manufacturers are making a lot of efforts to develop technologies for reducing use of fuels and generation of exhaust gases for the environment-friendly policies and high fuel efficiency.

Under the background, many interests and efforts are being made in the development of technologies such as hybrid electric vehicles (HEVs) and plug-in hybrid electric vehicles (PHEVs), which combine the power of an engine and a motor for high fuel efficiency.

The disclosure of this section is to provide background of the invention. Applicant notes that this section may contain information available before this application. However, by providing this section, Applicant does not admit that any information contained in this section constitutes prior art.

SUMMARY

Environment-friendly vehicles secure a heat source that is necessary for heating by driving an engine to satisfy heating performance when heating is required in the winter season (in the case of a vehicle without any electric heater). Then, when the engine is driven for heating, a torque is increased to improve the efficiency of the engine and increase the state of charge (SOC) of the high-voltage battery.

Figure 1:
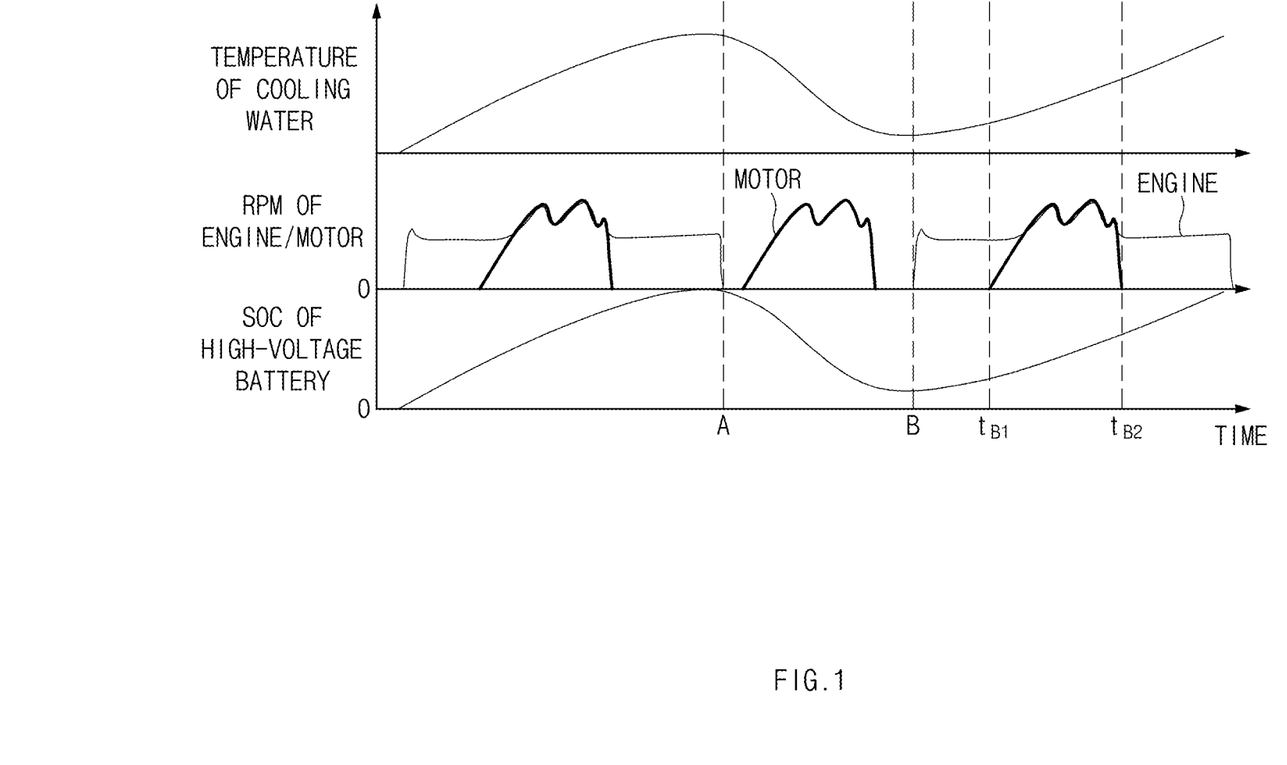
FIG. 1 is a view illustrating a technology of controlling charging of a vehicle during general heating control.

However, if the SOC of the high-voltage battery becomes excessive during driving of the engine as illustrated in FIG. 1, the vehicle is driven only by an electric motor to exhaust the SOC (increase fuel efficiency) according to a travel strategy after the heating control is released. In this case, the temperature of the cooling water of the engine decreases again, and the engine has to be driven and released frequently as the engine has to be driven again to secure a heating source.

The present disclosure is conceived to solve the above-described problems of the related art, and the present disclosure provides an apparatus for controlling charging of a vehicle, which may prevent overcharging of a high-voltage battery by charging an auxiliary battery by using the high-voltage battery if an SOC of the high-voltage battery increases by a specific level or more during control of an engine for heating, and may improve fuel efficiency by using the charged auxiliary battery as energy of a load of an electric part, a system including the same, and a method thereof.

The technical objects of the present disclosure are not limited to the above-mentioned one, and the other unmentioned technical objects will become apparent to those skilled in the art from the following description.

In accordance with an aspect of the present disclosure, there is provided an apparatus for controlling charging of a vehicle, the apparatus including a high-voltage battery SOC determining unit configured to determine a state of charge (SOC) of a high-voltage battery that is a main power source, an auxiliary battery SOC determining unit configured to determine an SOC of an auxiliary battery that assists power of the high-voltage battery, and an auxiliary battery charging control unit configured to, when receiving a request for an operation of an engine for controlling heating, perform a control such that the auxiliary battery is charged by using the high-voltage battery.

The high-voltage battery SOC determining unit may determine the SOC of the high-voltage battery through interaction with a battery management unit.

The auxiliary battery SOC determining unit may determine the SOC of the auxiliary battery through interaction with the auxiliary battery SOC detecting unit that senses the SOC of the auxiliary battery.

The auxiliary battery charging control unit may perform a control such that, if the SOC of the auxiliary battery is less than a predetermined reference value, the auxiliary battery is charged by using the high-voltage battery.

The auxiliary battery charging control unit may perform a control to charge the auxiliary battery by using the high-voltage battery in one or more of a case in which the SOC of the auxiliary battery is a predetermined reference value or more, a case in which the gear of the vehicle is located in the P-stage, the R-stage, or the N-stage, a case of high-speed driving, a case of high hill-climbing driving, and a case in which a high-voltage part is operated.

The auxiliary battery charging control unit may perform a control such that, if the SOC of the high-voltage battery is not less than a predetermined reference value when a request for an operation of the engine for controlling heating is received, the auxiliary battery is charged by using the SOC of the high-voltage battery.

The apparatus may further include a driving mode determining unit configured to determine a driving mode according to the SOC of the high-voltage battery.

In accordance with another aspect of the present disclosure, there is provided a system for controlling charging of a vehicle, the apparatus including a high-voltage battery that is a main power source of the vehicle, an auxiliary battery that is an auxiliary power source of the vehicle, an auxiliary battery SOC detecting unit configured to detect a state of charge (SOC) of the auxiliary battery, and a vehicle charging control unit configured to, when receiving a request for an operation of an engine for controlling heating, perform a control such that the auxiliary battery is charged by using the high-voltage battery.

The auxiliary battery SOC detecting unit may include an intelligent battery sensor (IBS).

The vehicle charging control unit may perform control to charge the auxiliary battery by using the high-voltage battery if the SOC of the high-voltage battery is not less than a predetermined reference value when a request for an operation of the engine for controlling heating is received.

The vehicle charging control unit may be a hybrid control unit (HCU).

The vehicle charging control unit may include a high-voltage battery SOC determining unit configured to determine an SOC of a high-voltage battery that is a main power source, an auxiliary battery SOC determining unit configured to determine an SOC of an auxiliary battery that assists power of the high-voltage battery, and an auxiliary battery charging control unit configured to, when receiving a request for an operation of an engine for controlling heating, perform a control such that the auxiliary battery is charged by using the high-voltage battery.

In accordance with another aspect of the present disclosure, there is provided a method for controlling charging of a vehicle, the method including determining a state of charge (SOC) of a high-voltage battery that is a main power source, determining an SOC of an auxiliary battery that assists power of the high-voltage battery, and when receiving a request for an operation of an engine for controlling heating, performing a control such that the auxiliary battery is charged by using the high-voltage battery.

The determining of the SOC of the high-voltage battery may include determining the SOC of the high-voltage battery through interaction with a battery management unit.

The determining of the SOC of the auxiliary battery may include determining the SOC of the auxiliary battery through interaction with the auxiliary battery SOC detecting unit that senses the SOC of the auxiliary battery.

The method may further include if the SOC of the auxiliary battery is less than a predetermined reference value, performing a control to charging the auxiliary battery by using the high-voltage battery.

The method may further include performing a control to charge the auxiliary battery by using the high-voltage battery in one or more of a case in which the SOC of the auxiliary battery is a predetermined reference value or more, a case in which the gear of the vehicle is located in the P-stage, the R-stage, or the N-stage, a case of high-speed driving, a case of high hill-climbing driving, and a case in which a high-voltage part is operated.

The performing of the control may include performing a control such that, if the SOC of the high-voltage battery is not less than a predetermined reference value when a request for an operation of the engine for controlling heating is received, the auxiliary battery is charged by using the SOC of the high-voltage battery.

The method may further include if the SOC of the high-voltage battery is less than a predetermined reference value and the SOC of the auxiliary battery is not less than the predetermined reference value when a request for an operation of the engine for controlling heating is received, performing discharge control of the auxiliary.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, tams, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific tams, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

An aspect of the present invention provides a method for controlling battery charging in a hybrid vehicle during an operation to heat the vehicle's cabin. A combustion engine of the hybrid vehicle and its cooling water provides heat for warming the vehicle's cabin.

Figure 5:
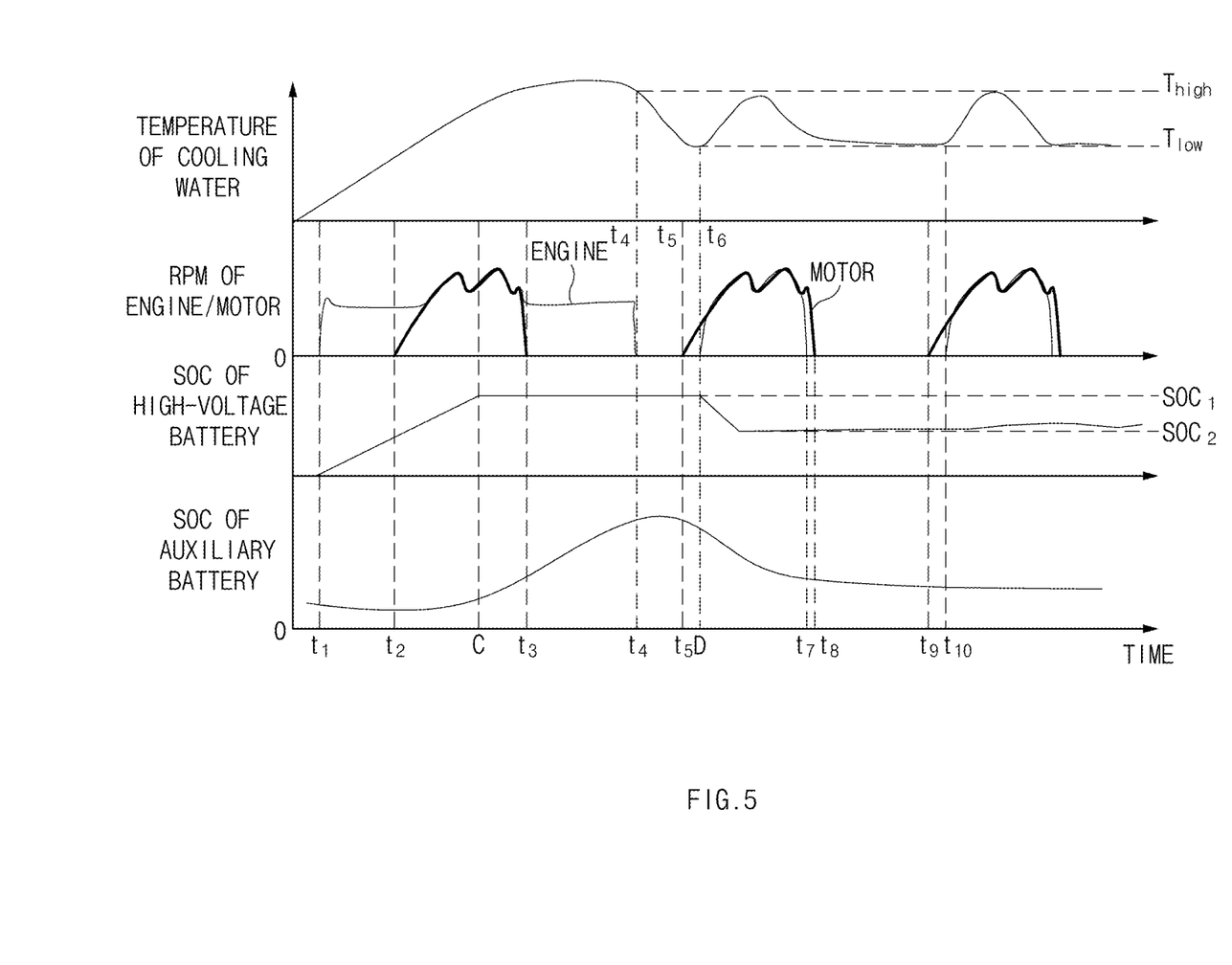
FIG. 5 is a view illustrating a method for controlling charging of a vehicle during heat control according to an embodiment of the present disclosure.

Referring to FIG. 5, after starting of the vehicle (starting of the engine, $t_1$), high-voltage battery 111 is charged to a first determined level ($SOC_1$) under control of at least one controller 100, 114, 115 of the vehicle. In embodiments, the at least one controller activates wheel-driving motor 116 while charging the high voltage battery ($t_2$).

After SOC of the high-voltage battery reaches the first predetermined level (at time C), then at least one controller stops the motor while SOC of the high-voltage battery is maintained at the first predetermined level.

In embodiments, after temperature of cooling water reaches a first predetermined temperature ($T_{high}$) while SOC of the high-voltage battery is maintained at the first predetermined level, the at least one controller stops the engine 117 ($t_3$). In embodiments, when the engine operates alone to warm the cooling water (idle operation), the auxiliary battery is charged while maintaining SOC of the high-voltage battery at the first predetermined level ($t_3$-$t_4$).

Subsequently, when temperature of the cooling water falls to a second predetermined temperature ($T_{low}$), the controller activates the engine again to heat the cooling water (at $t_6$ and $t_{10}$). In embodiments, the controller activates the generator/ motor 116 (at $t_5$ and $t_9$) prior to re-activation of the engine (at $t_6$ and $t_{10}$) and stops the engine (at $t_7$) prior to stopping of the generator/motor 116 (at $t_8$) such that the engine operates only when the motor operates and does not operate alone (idle operation) for heating the cooling water. In embodiments, even when the engine was re-activated at $t_6$, the high-voltage battery is discharged to a second predetermined level ($SOC_2$).

The vehicle according to embodiments of the present disclosure is an environment-friendly vehicle that travels while an electric motor is driven by a high-voltage battery and an auxiliary battery, and may include a hybrid electric vehicle (HEV), an electric vehicle (EV), a plug-in hybrid vehicle (PHEV), and a fuel cell electric vehicle (FCEV).

The system for controlling charging of a vehicle of an environment-friendly vehicle according to the present disclosure may prevent overcharging of a high-voltage battery by charging an auxiliary battery by using the high-voltage battery regardless of a state of charge (SOC) level of the auxiliary battery if an SOC of the high-voltage battery increases by a specific level or more during control of an engine for heating, and may improve fuel efficiency by using the charged auxiliary battery as energy of a load of an electric part.

Further, the system for controlling charging of an environment-friendly vehicle according to embodiments of the present disclosure may charge the auxiliary battery regardless of the SOC of the high-voltage battery by detecting the SOC of the auxiliary battery through a sensor configured to detect the SOC of the auxiliary battery.

Hereinafter, embodiments of the present disclosure will be described in detail with reference to FIGS. 2 to 6.

Figure 2:
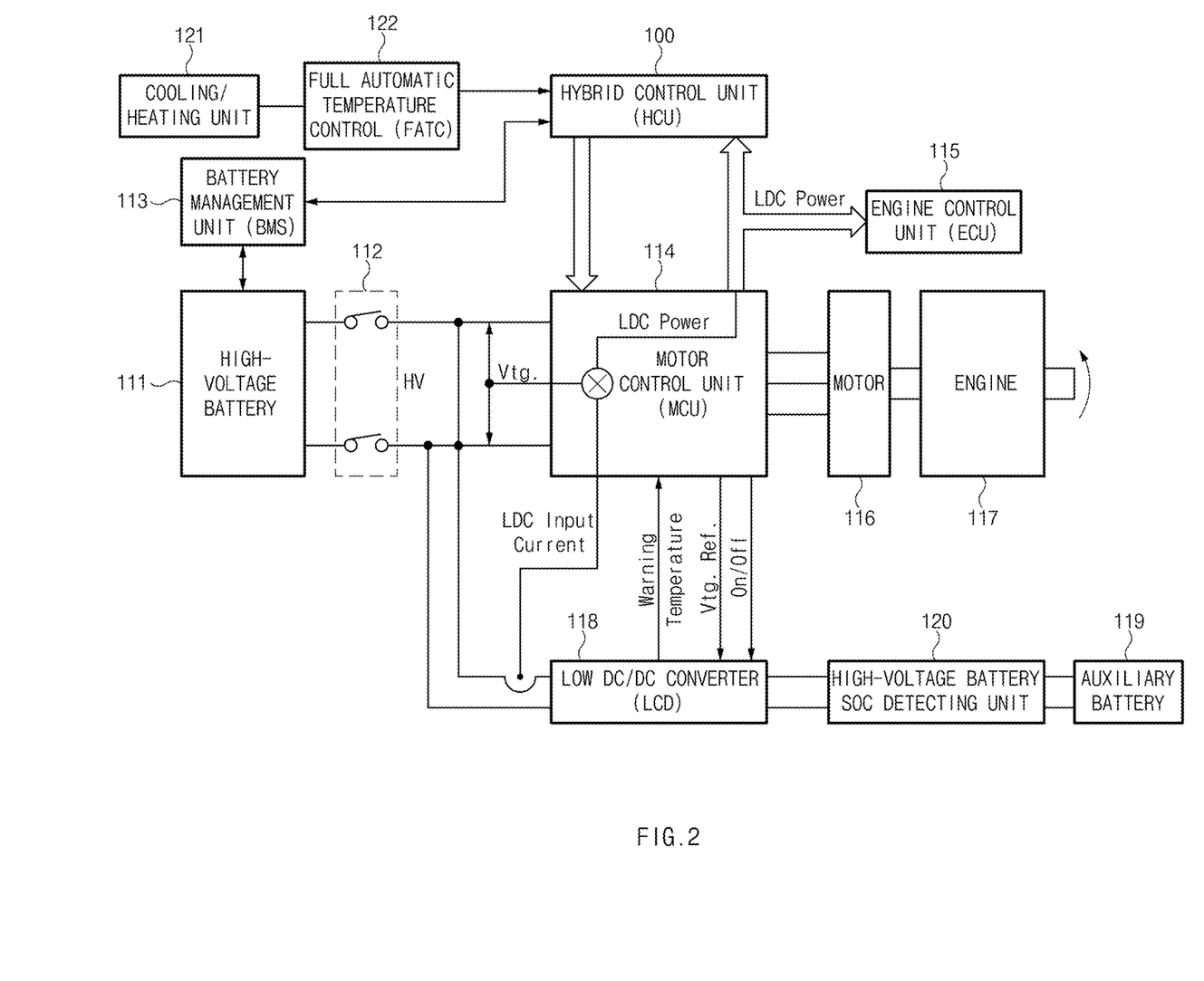
FIG. 2 is a diagram of a system for controlling charging of a vehicle according to an embodiment of the present disclosure.
Figure 3:
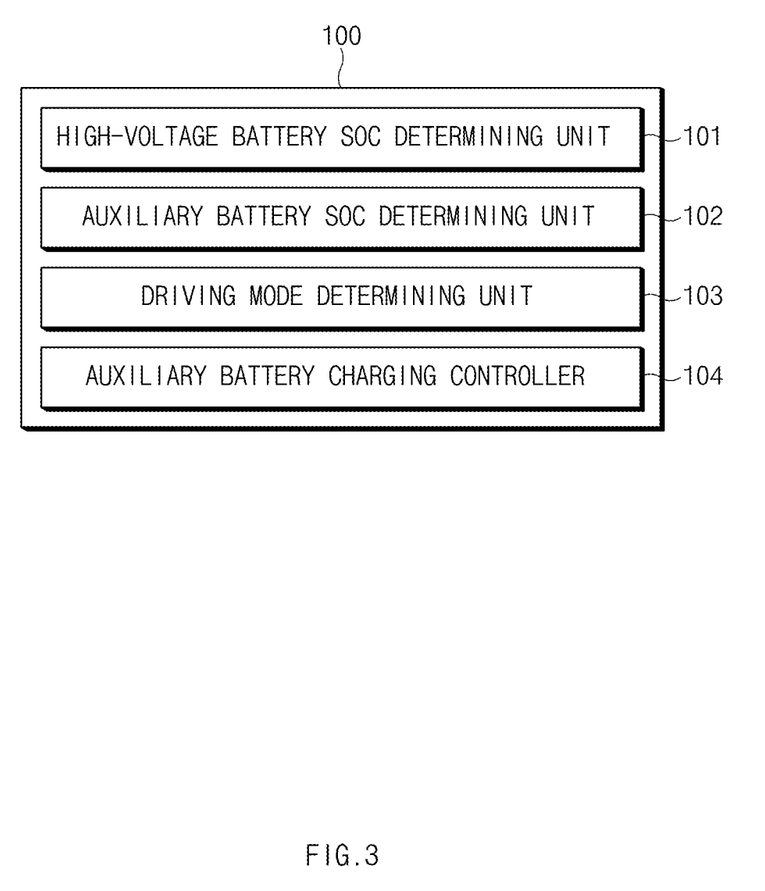
FIG. 3 is a block diagram of a hybrid control unit of FIG. 2.

FIG. 2 is a diagram of a system for controlling charging of an environment-friendly vehicle according to an embodiment of the present disclosure. FIG. 3 is a block diagram of a hybrid control unit of FIG. 2.

Referring to FIG. 2, the system for controlling charging of an environment-friendly vehicle according to an embodiment of the present disclosure includes a hybrid control unit (HCU) 100 that is a high level controller, a high-voltage battery 111, a main relay 112, a battery management system (BMS) 113, a motor control unit (MCU) 114 that is a low level controller, an engine control unit (ECU) 115, a motor 116, an engine 117, a low DC/DC converter (LDC) 118, an auxiliary battery 119, an auxiliary battery SOC detecting unit 120, a cooling/heating unit 121, a full automatic temperature control (FATC) 122.

The high-voltage battery 111 is a device for storing electrical energy and supplying electricity to a vehicle system, and the auxiliary battery 119 is charged by using the high-voltage battery 111. Then, when the gear is located in a P-stage (stop stage), an R-stage (rearward stage), or an N-stage, the auxiliary battery 119 may be charged by using the high-voltage battery during a high-speed or high-load driving (when the portion of the charging energy is very low as compared with the whole driving energy).

The main relay 112 delivers the electrical energy of the high-voltage battery 111 to a motor controller 114.

The motor controller 114 drives the motor 116 by using electric power of the high-voltage battery received through the main relay 112 or electric power received through the low DC/DC converter 118.

The driving motor 116 is a main power source 111 for supplying electric power, and is connected to a high-voltage battery 111.

The engine 117 is an internal combustion engine that supplies power to the environment-friendly vehicle.

The cooling/heating unit 121 includes a heater or an air conditioner.

The full automatic temperature control (FATC) 122 requests an operation of the engine from the hybrid control unit 100 to adjust the cooling/heating unit 121 and control heating.

The battery management system (BMS) 113 manages an overall state of the high-voltage battery 111 that is a main power source, calculates the SOC of the high-voltage battery 111 based on temperature, voltage, and current, and delivers the result to the hybrid control unit 100.

The low DC/DC converter (LDC) 118 rectifies electric power of the high-voltage battery 111 of a high voltage to produce a direct current, and outputs the direct current. That is, the low DC/DC converter (LDC) 118 switches a general direct current to produce an alternating current, steps down voltage of the alternating current by using a coil, a transformer, and a capacitance, rectifies the alternating current to a direct current, and supplies electricity according to voltages used in the electric loads.

The auxiliary battery SOC detecting unit 120 senses the SOC of the auxiliary battery 119 and provides the sensed SOC to the low DC/DC converter (LDC) 118. To achieve this, the auxiliary battery SOC detecting unit 120 may include an intelligent battery sensor (IBS).

The hybrid controller (HCU) 100 is a high level controller that collectively controls an overall operation of the environment-friendly vehicle, and corresponds to the apparatus for controlling charging of the vehicle in the present disclosure.

The hybrid control unit (HCU) 100 communicates with the motor control unit (MCU) 114 that is a low level controller in a specific scheme to control a torque, a speed, and a power generation torque of the motor 116 that is a driving source, and communicates with the engine control unit (ECU) 115 that controls the engine 117 configured to generate power for generation of voltage as an auxiliary power source.

Further, the hybrid control unit (HCU) 100 communicates with the battery management unit (BMS) 113 that manages an overall state of the high-voltage battery 111 that is a main power source to determine a driving mode according to the SOC of the high-voltage battery and controls a torque and a speed of the motor, and communicates with a transmission control unit (TCU), that determines and controls transmission ratio according to a vehicle speed and a request for driving by the driver to perform a control such that the vehicle speed required by the driver is maintained.

Then, the communication between the hybrid control unit (HCU) 100, and the motor control unit (MCU) 114 and the engine control unit (ECU) 117 that are low level controllers is performed through CAN communication such that information is exchanged and control signals are transmitted and received between them.

The hybrid control unit (HCU) 100 checks the SOC of the auxiliary battery through the low DC/DC converter (LDC) 118, and checks the SOC of the high-voltage battery through the battery management system (BMS) 113. The hybrid control unit (HCU) 100 determines whether the SOC of the auxiliary battery is lower than a predetermined reference value (X), a high load of an electric part, such as a headlamp, a wiper, or a heating wire of a seat is on, or charging energy corresponding to high speed or high hill-climbing driving is very low as compared with whole driving energy (S102), and when a high load of an electric part, such as a headlamp, a wiper, or a heating wire of a seat, is on, in the case of high-speed or high hill-climbing driving, or when the gear is located in a P-stage, an R-stage, or an N-stage, requests the low DC/DC converter 118 to control charging of the auxiliary battery.

Further, the hybrid control unit 100 checks the SOC of the high-voltage battery if receiving a request for switching on the engine for controlling heating from the full automatic temperature control 122, and when the SOC of the high-voltage battery is higher than a predetermined reference value (Y), requests control of charging of the auxiliary battery using the high-voltage battery from the low DC/DC converter 118.

Further, when receiving a request for an operation of the engine for controlling heating, the hybrid control unit 100 may control discharging of the auxiliary battery if the SOC of the high-voltage battery is less than a predetermined reference value and the SOC of the auxiliary battery is a predetermined reference value or more.

In this way, the present disclosure may charge the high-voltage battery with the auxiliary battery to maintain the SOC of the high-voltage battery at a specific level even when the high-voltage battery is charged during driving of the engine for heating, thereby preventing overcharging of the high-voltage battery, and may enhance fuel efficiency by using the charged battery during an operation of a high load of an electric part, high-speed driving, or high hill-climbing driving, or when the gear is in the P-stage, the R-stage, or the N-stage.

However, when the SOC of the auxiliary battery detected by the auxiliary battery SOC detecting unit 120 is lower than a predetermined reference value, the auxiliary battery is charged by using the high-voltage battery regardless of the SOC of the high-voltage battery.

A detailed configuration of the hybrid control unit 100 that is the apparatus for controlling charging of a vehicle will be described with reference to FIG. 3.

The hybrid control unit 100 includes a high-voltage battery SOC determining unit 101, an auxiliary battery SOC determining unit 102, a driving mode determining unit 103, and an auxiliary battery charging control unit 104.

The high-voltage battery SOC determining unit 101 receives information on the SOC of the high-voltage battery from the battery management unit 113 to determine the SOC of the high-voltage battery.

The auxiliary battery SOC determining unit 102 determines the SOC of the auxiliary battery by using the information on the SOC of the auxiliary battery received from the auxiliary battery SOC detecting unit 120 to determine the SOC of the auxiliary battery.

The driving mode determining unit 103 determines the driving mode according to the level of the SOC of the high-voltage battery. Then, the driving mode may include an EV mode in which the vehicle is driven only by electrical energy, and an HEV mode in which the vehicle is driven both by electrical energy and through driving of the engine. That is, if the SOC of the high-voltage battery is a specific reference value or more, the vehicle is driven in the EV mode, and if the SOC of the high-voltage battery is less than the specific reference value, the vehicle is driven in the HEV mode.

The auxiliary battery charging control unit 104 performs a control such that the auxiliary battery is charged by using the high-voltage battery if the SOC of the high-voltage battery is a specific level or more, regardless of the level of the SOC of the auxiliary battery, when receiving a request for an operation of the engine for controlling heating.

Further, the auxiliary battery charging control unit 104 performs a control to charge the auxiliary battery by using the high-voltage battery in one or more of the case in which the SOC of the auxiliary battery is a predetermined reference value or more, the case in which the gear of the vehicle is located in the P-stage, the R-stage, or the N-stage, the case of high-speed driving, the case of high hill-climbing driving, and the case in which a high-voltage part is operated.

In this way, the present disclosure may prevent overcharging of the high-voltage battery by charging the high-voltage battery with the auxiliary battery to maintain the level of the SOC of the high-voltage battery at a suitable level in a state in which the torque of the engine is raised during driving of the engine for heating.

Then, the apparatus for controlling charging of the vehicle according to embodiments of the present disclosure charges the auxiliary battery 119 by using the high-voltage battery when the gear is located in a P-stage (stop stage), an R-stage (rearward stage), or an N-stage, the auxiliary battery 119 may be charged by using the high-voltage battery during a high-speed or high-load driving (when the portion of the charging energy is very low as compared with the whole driving energy), and the present disclosure charges the auxiliary battery by using the high-voltage battery when the SOC of the auxiliary battery is low after determining the SOC of the auxiliary battery through the auxiliary battery SOC detecting unit 120. Then, the level of the SOC of the high-voltage battery is not considered (control of a variable voltage of the auxiliary battery).

Further, the apparatus for controlling charging of a vehicle according to embodiments of the present disclosure may monitor the level of the SOC of the high-voltage battery in the case of an engine driving condition for heating, and may charge the auxiliary battery by using energy of the high-voltage battery if the level of the SOC of the high-voltage battery is increased to a predetermined reference level or more. Through the control, because the level of the SOC of the high-voltage battery may be maintained at a suitable level and the energy of the charged auxiliary battery may be used to control the load of an electric part, fuel efficiency may be improved when the vehicle travels on an actual road.

Figure 4:
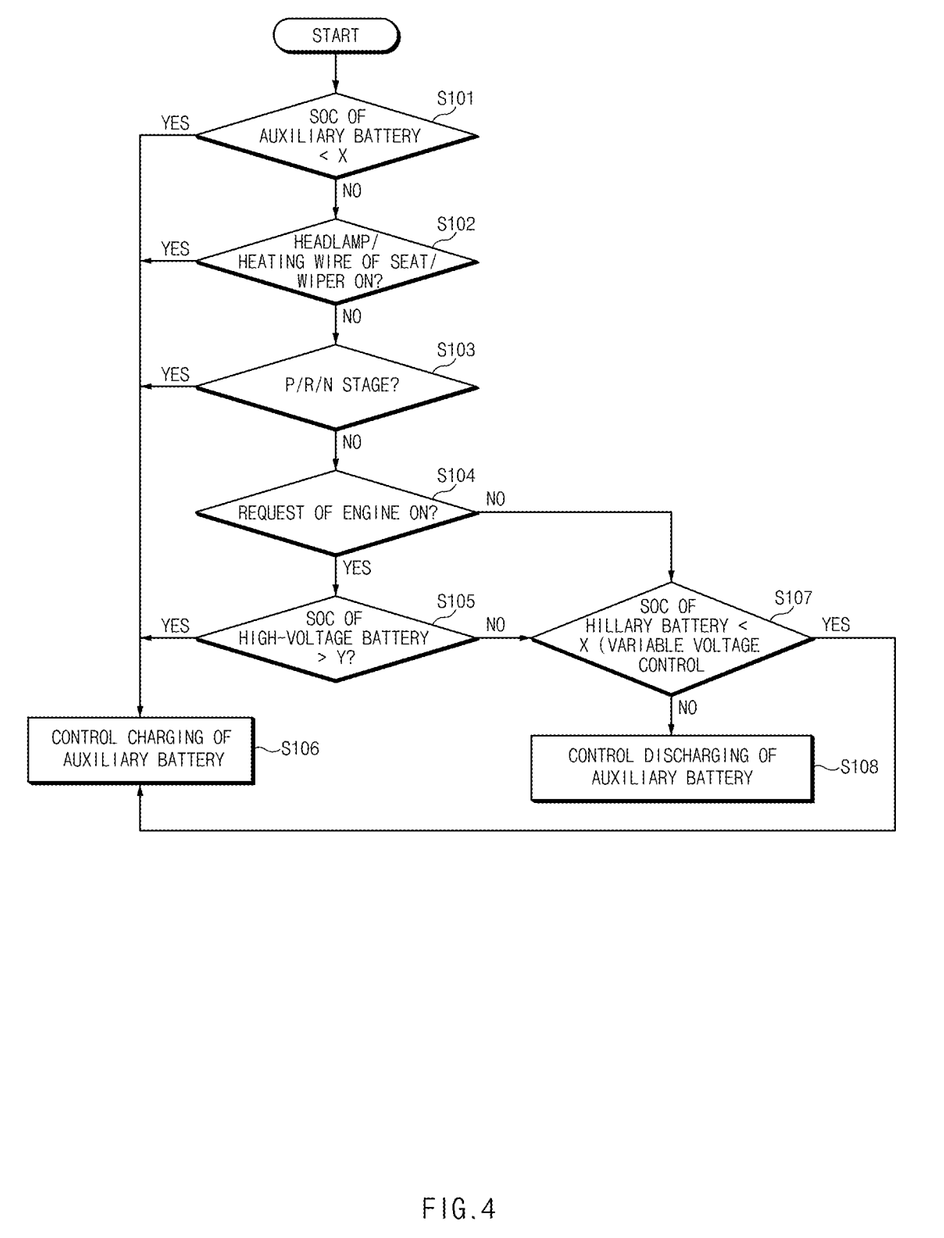
FIG. 4 is a flowchart illustrating a technology of controlling charging of a vehicle during heating control according to an embodiment of the present disclosure.

A method for controlling charging of a vehicle during heating control according to an embodiment of the present disclosure will be described in detail with reference to FIG. 4. Then, the apparatus for controlling charging of a vehicle refers to the hybrid control unit (HCU) 100 of FIG. 1.

First, the apparatus for controlling charging of a vehicle checks the SOC of the auxiliary battery (S101), and when the SOC of the auxiliary battery is smaller than a predetermined reference value (X), requests control of charging of the auxiliary battery from the low DC/DC converter 118 (S106). Accordingly, the low DC/DC converter 118 charges the auxiliary battery by using the high-voltage battery.

Meanwhile, when the SOC of the auxiliary battery is larger than or equal to the predetermined reference value (X), the apparatus for controlling charging of a vehicle determines whether the portion of the charged energy is very low as compared with the whole driving energy, such as in the case of a high load of an electric part, such as a headlamp, a wiper, or a heating wire of a seat, or high-speed or high hill-climbing driving (S102), and requests control of charging of the auxiliary battery from the low DC/DC converter 118 when the portion of the charged energy is very low (S106). Accordingly, the low DC/DC converter 118 charges the auxiliary battery by using the high-voltage battery.

Meanwhile, when the portion of the charged energy is very low as compared with the whole driving energy, such as in the case of a high load of an electric part, such as a headlamp, a wiper, or a heating wire of a seat, or high-speed or high hill-climbing driving, the apparatus for controlling charging of a vehicle checks whether the gear is located in the P-stage, the R-stage, or the N-stage (S103).

When the gear is located in the P-stage, the R-stage, or the N-stage, the apparatus for controlling charging of the vehicle requests control of charging of the auxiliary battery from the low DC/DC converter 118 (S106). Meanwhile, if the gear is located in none of the P-stage, the R-stage, or the N-stage, the system for controlling charging of a vehicle checks whether there is a request for switching-on of the engine for controlling heating from the full automatic temperature control (FATC) 121 (S104), and checks the SOC of the auxiliary battery if there is no request for switching on of the engine (S107). Accordingly, the system for controlling charging of a vehicle requests control of discharging of the auxiliary battery from the low DC/DC converter 118 if the SOC of the auxiliary battery is larger than the predetermined reference value (X) (S108), and requests control of charging of the auxiliary battery from the low DC/DC converter 118 if the SOC of the auxiliary battery is not larger than the predetermined reference value (X) (S106).

Meanwhile, when a request for switching-on of the engine is made in operation 5104, the system for controlling charging of a vehicle checks the SOC of the high-voltage battery to determine whether the SOC of the high-voltage battery is larger than a predetermined reference value (Y) (S105), and requests control of charging of the auxiliary battery from the low DC/DC converter 118 when the SOC of the high-voltage battery is larger than the predetermined reference value (Y) (S106). Accordingly, the low DC/DC converter 118 charges the auxiliary battery by using the high-voltage battery.

On the other hand, when the SOC of the high-voltage battery is smaller than or equal to the predetermined reference value (Y), the system for controlling charging of a vehicle checks whether the SOC of the auxiliary battery is larger than the predetermined reference value (X) again (S107), and request control of discharging of the auxiliary battery from the low DC/DC converter 118 when the SOC of the auxiliary battery is larger than the predetermined reference value (X) (S108) and requests control of charging of the auxiliary battery from the low DC/DC converter 118 if the SOC of the auxiliary battery is not larger than the predetermined reference value (X) (S106).

Then, the reference value (X) for determining the SOC of the auxiliary battery be set to a charging control start time point of the auxiliary battery by utilizing energy of the high-voltage battery in a normal condition in consideration of an authentication mode and an actual road, and may be set through differentiation for speeds of the vehicle. For example, because the portion of the energy used to charge the auxiliary battery as compared with the driving energy of the vehicle is relatively low to hardly influence the actual fuel efficiency on the road during high-speed driving of the vehicle, the reference value (X) is raised. Meanwhile, because the charging energy of the auxiliary battery influences the actual fuel efficiency of the road during low-speed driving, the reference value (X) is lowered. For example, the reference value (X) may be set to 80% when the speed of the vehicle is not more than 60 KPH, may be set to 85% when the speed of the vehicle is 60 to 100 KPH, and may be set to 90% when the speed of the vehicle is not less than 100 KPH.

The reference value (Y) for determining the SOC of the high-voltage battery is an SOC threshold point of the high-voltage battery at which the charging of the auxiliary battery is started in a heating driving condition, and may be set in consideration of an average SOC (determined for respective authentication modes) determined in a normal driving condition. For example, the reference value (Y) may be set to 60% of the average SOC in the FTP mode (city mode), and may be set to 60+α% (α: determined through an actual road test) during a heating driving condition.

FIG. 1 is a view illustrating a technology of controlling charging of a vehicle during general heating control. FIG. 5 is a flowchart illustrating a technology of controlling charging of a vehicle during heating control according to an embodiment of the present disclosure.

In a comparison of FIGS. 1 and 5, conventionally, if the apparatus for controlling charging of a vehicle receives a request for driving of an engine from the full automatic temperature control 122 to secure a heat source for heating, it drives the engine regardless of a driving condition to secure the heat source for heating. That is, because the engine is made to be driven unconditionally to secure a heat source for heating even when the SOC of the high-voltage battery is sufficient, referring to FIG. 1, the engine is driven if the temperature of cooling water decreases, the driving of the engine is stopped if the charging of the high-voltage battery is started such that the SOC of the high-voltage battery increases to a specific level or more (A) so that the vehicle continues to be driven in the EV mode using electrical energy, and the engine is driven again if the temperature of the cooling water decreases again (B). In this way, conventionally, the driving and releasing of the engine for heating are frequently repeated so that the efficiency of the engine may be lowered.

In contrast, referring to FIG. 5, if receiving a request for driving of the engine from the full automatic temperature control 122 to secure a heat source for heating, the apparatus for controlling charging of a vehicle monitors the SOC of the high-voltage battery, and if the SOC of the high-voltage battery increase by a specific level or more (C), the auxiliary battery is charged by using the high-voltage battery (1). Accordingly, the SOC of the high-voltage battery is maintained at a specific level during the operation of the engine (2), and the SOC of the auxiliary battery increases. Thereafter, when a headlamp, a wiper, or a heating wire of a seat is on, when the gear is located in a P-stage, an R-stage, or an N-stage, or in the case of high-speed or high hill-climbing driving, the SOC of the auxiliary battery decreases (3) if the charged auxiliary battery is used (D) during high hill-climbing driving of the vehicle. Thereafter, idling of the heating engine may be prevented through maintenance of the suitable SOC level.

In this way, secondary and tertiary engine idling may be prevented by preventing excessive charging of the high-voltage battery and an increase in the actual fuel efficiency on the road may be pursued by controlling the load of an electric part by using the charged auxiliary battery.

Figure 6:
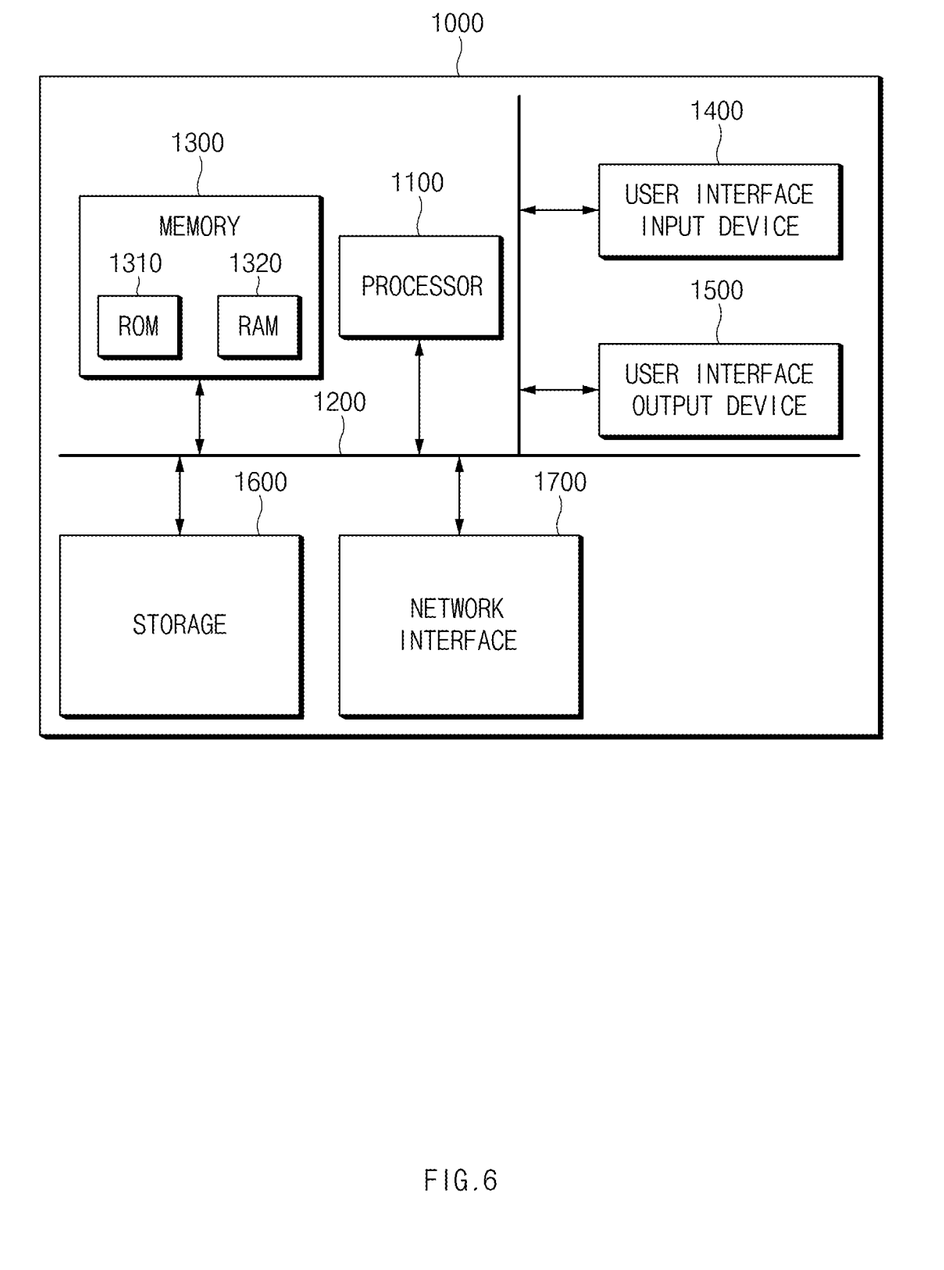
FIG. 6 is a diagram of a computer system to which a method for controlling charging of a vehicle during heating control according to an embodiment of the present disclosure is applied.

FIG. 6 is a diagram of a computer system to which a method for controlling charging of a vehicle during heating control according to an embodiment of the present disclosure is applied.

Referring to FIG. 6, the computing system 11000 may include at least one processor 11100 connected through a bus 11200, a memory 11300, a user interface input device 11400, a user interface output device 11500, a storage 11600, and a network interface 11700.

The processor 11100 may be a central processing unit (CPU) or a semiconductor device that processes instructions stored in the memory 11300 and/or the storage 11600. The memory 11300 and the storage 11600 may include various volatile or nonvolatile storage media. For example, the memory 11300 may include a read only memory (ROM) and a random access memory (RAM).

Accordingly, the steps of the method or algorithm described in relation to the embodiments of the present disclosure may be implemented directly by hardware executed by the processor 11100, a software module, or a combination thereof. The software module may reside in a storage medium (that is, the memory 11300 and/or the storage 11600), such as a RAM memory, a flash memory, a ROM memory, an EPROM memory, an EEPROM memory, a register, a hard disk, a detachable disk, or a CD-ROM.

The storage medium is coupled to the processor 11100, and the processor 11100 may read information from the storage medium and may write information in the storage medium. In another method, the storage medium may be integrated with the processor 11100. The processor and the storage medium may reside in an application specific integrated circuit (ASIC). The ASIC may reside in a user terminal. In another method, the processor and the storage medium may reside in the user terminal as an individual component.

The present technology may prevent overcharging of a high-voltage battery by charging an auxiliary battery by using the high-voltage battery regardless of a state of charge (SOC) level of the auxiliary battery if an SOC of the high-voltage battery increases by a specific level or more during control of an engine for heating, and may improve fuel efficiency by using the charged auxiliary battery as energy of a load of an electric part.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure can be construed by the claims, and it will be understood that all the technical spirits within the equivalent range fall within the scope of the present disclosure.

What is claimed is:

1. An apparatus for controlling charging of a vehicle, the apparatus comprising:
    a high-voltage battery SOC determining unit configured to determine a state of charge (SOC) of a high-voltage battery that is a main power source;
    an auxiliary battery SOC determining unit configured to determine an SOC of an auxiliary battery that assists power of the high-voltage battery; and
    an auxiliary battery charging control unit configured to, when receiving a request for an operation of an engine for controlling heating from a full automatic temperature control (FATC), perform a control such that the auxiliary battery is charged by using the high-voltage battery,
    wherein the auxiliary battery charging control unit performs a control such that, if the SOC of the auxiliary battery is less than a predetermined reference value, the auxiliary battery is charged by using the high-voltage battery.

2. The apparatus of claim 1, wherein the high-voltage battery SOC determining unit determines the SOC of the high-voltage battery through interaction with a battery management unit.

3. The apparatus of claim 1, wherein the auxiliary battery SOC determining unit determines the SOC of the auxiliary battery through interaction with an auxiliary battery SOC detecting unit that senses the SOC of the auxiliary battery.

4. The apparatus of claim 1, wherein the auxiliary battery charging control unit performs a control to charge the auxiliary battery by using the high-voltage battery in one or more of a case in which the SOC of the auxiliary battery is a predetermined reference value or more, a case in which the gear of the vehicle is located in the P-stage, the R-stage, or the N-stage, a case of high-speed driving, a case of high hill-climbing driving, and a case in which a high-voltage part is operated.

5. The apparatus of claim 1, wherein the auxiliary battery charging control unit performs a control such that, if the SOC of the high-voltage battery is not less than a predetermined reference value when a request for an operation of the engine for controlling heating is received from the full automatic temperature control (FATC), the auxiliary battery is charged by using the SOC of the high-voltage battery.

6. The apparatus of claim 1, further comprising:
    a driving mode determining unit configured to determine a driving mode according to the SOC of the high-voltage battery.

7. A system for controlling charging of a vehicle, the system comprising:
    a high-voltage battery that is a main power source of the vehicle;
    an auxiliary battery that is an auxiliary power source of the vehicle;
    an auxiliary battery SOC detecting unit configured to detect a state of charge (SOC) of the auxiliary battery; and
    a vehicle charging control unit configured to, when receiving a request for an operation of an engine for controlling heating from a full automatic temperature control (FATC), perform a control such that the auxiliary battery is charged by using the high-voltage battery,
    wherein the vehicle charging control unit performs a control such that, if the SOC of the auxiliary battery is less than a predetermined reference value, the auxiliary battery is charged by using the high-voltage battery.

8. The system of claim 7, wherein the auxiliary battery SOC detecting unit includes an intelligent battery sensor (IBS).

9. The system of claim 7, wherein the vehicle charging control unit performs control to charge the auxiliary battery by using the high-voltage battery if the SOC of the high-voltage battery is not less than a predetermined reference value when a request for an operation of the engine for controlling heating is received from the full automatic temperature control (FATC).

10. The system of claim 7, wherein the vehicle charging control unit is a hybrid control unit (HCU).

11. The system of claim 7, wherein the vehicle charging control unit includes:
   a high-voltage battery SOC determining unit configured to determine an SOC of a high-voltage battery that is a main power source;
   an auxiliary battery SOC determining unit configured to determine an SOC of an auxiliary battery that assists power of the high-voltage battery; and
   an auxiliary battery charging control unit configured to, when receiving a request for an operation of an engine for controlling heating from the full automatic temperature control (FATC), perform a control such that the auxiliary battery is charged by using the high-voltage battery.

12. A method for controlling charging of a vehicle, the method comprising:
   determining, by a vehicle charging control unit, a state of charge (SOC) of a high-voltage battery that is a main power source;
   determining, by the vehicle charging control unit, an SOC of an auxiliary battery that assists power of the high-voltage battery;
   when receiving a request for an operation of an engine for controlling heating from a full automatic temperature control (FATC), performing, by the vehicle charging control unit, a control such that the auxiliary battery is charged by using the high-voltage battery; and
   if the SOC of the auxiliary battery is less than a predetermined reference value, performing, by the vehicle charging control unit, a control to charge the auxiliary battery by using the high-voltage battery.

13. The method of claim 12, wherein the determining of the SOC of the high-voltage battery includes:
   determining the SOC of the high-voltage battery through interaction with a battery management unit.

14. The method of claim 12, wherein the determining of the SOC of the auxiliary battery includes:
   determining the SOC of the auxiliary battery through interaction with the auxiliary battery SOC detecting unit that senses the SOC of the auxiliary battery.

15. The method of claim 12, further comprising:
   performing, by the vehicle charging control unit, a control to charge the auxiliary battery by using the high-voltage battery in one or more of a case in which the SOC of the auxiliary battery is a predetermined reference value or more, a case in which the gear of the vehicle is located in the P-stage, the R-stage, or the N-stage, a case of high-speed driving, a case of high hill-climbing driving, and a case in which a high-voltage part is operated.

16. The method of claim 12, wherein the performing of the control includes:
   performing a control such that, if the SOC of the high-voltage battery is not less than a predetermined reference value when a request for an operation of the engine for controlling heating is received from the full automatic temperature control (FATC), the auxiliary battery is charged by using the SOC of the high-voltage battery.

17. The method of claim 12, further comprising:
   if the SOC of the high-voltage battery is less than a predetermined reference value and the SOC of the auxiliary battery is not less than the predetermined reference value when a request for an operation of the engine for controlling heating is received from the full automatic temperature control (FATC), performing, by the vehicle charging control unit, discharge control of the auxiliary.

* * * * *